Patented Aug. 5, 1941

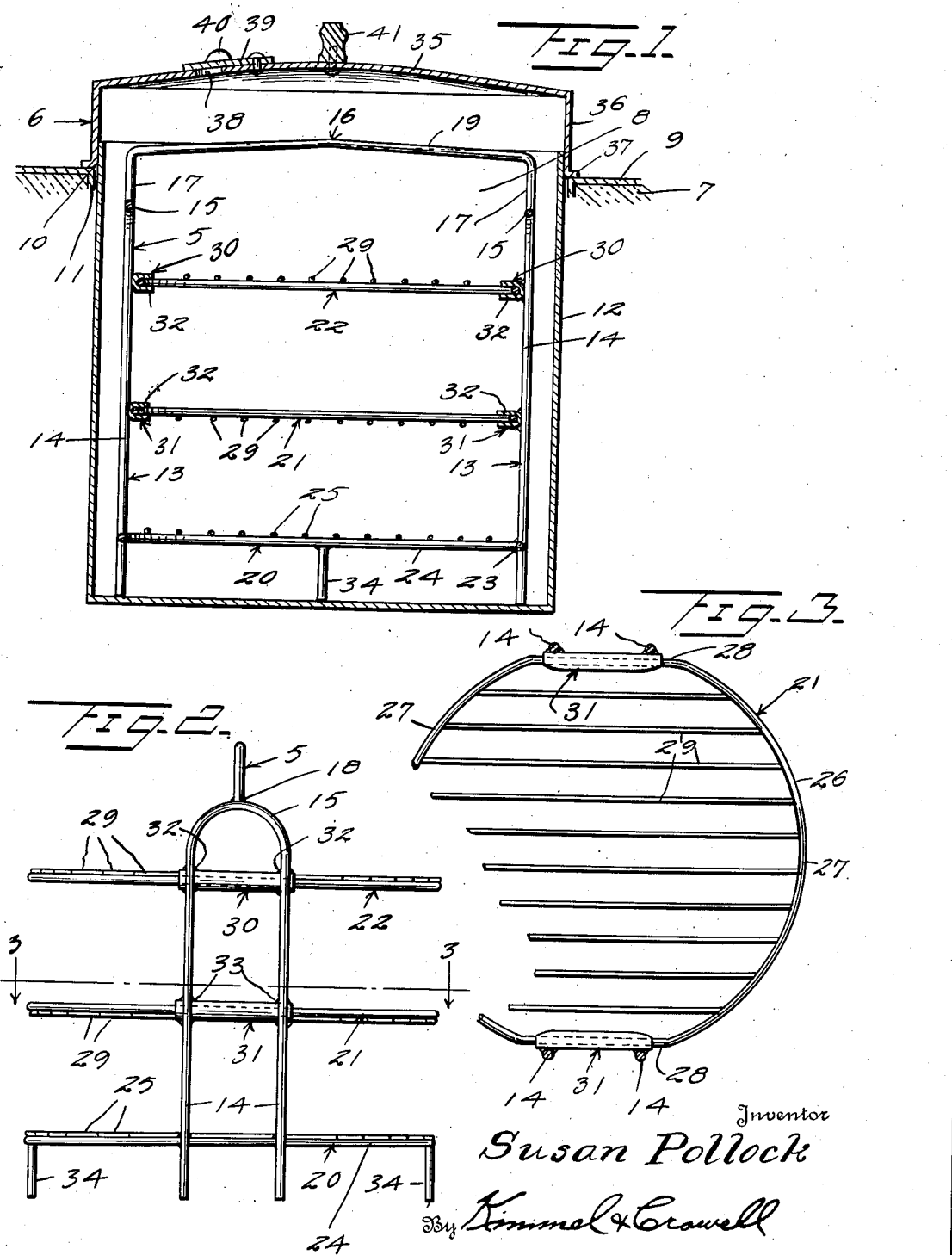

2,251,600

UNITED STATES PATENT OFFICE 2,251,600

BAKING APPLIANCE

Susan Pollock, Scranton, Pa., assignor of thirty-five per cent to Irving L. Epstein, Esq., Scranton, Pa.

Application October 26, 1940, Serial No. 363,044

3 Claims. (Cl. 53—1)

This invention relates to a baking appliance, more particularly to a baking rack designed primarily for use in connection with the deep well of an electrical range.

The invention aims to provide, in a manner as hereinafter set forth, a baking appliance including a skeleton supporting structure for supporting within the deep well of an electrical range superposed spaced suspended articles of food to be baked.

The invention further aims to provide, in a manner as hereinafter set forth, a baking appliance including a supporting structure of skeleton form for suspending superposed rows of food articles to be baked and for varying the distance between said rows.

The invention further aims to provide, in a manner as hereinafter set forth, a baking appliance for use in connection with the deep well of an electrical range, and with the appliance including skeleton means for suspending in the well articles of food to be baked at one level or at a plurality of levels.

The invention further aims to provide, in a manner as hereinafter set forth, a baking appliance for use in connection with the deep well of an electrical range and including skeleton means for suspending in the well articles of food to be baked at different levels.

The invention further aims to provide, in a manner as hereinafter set forth, a baking appliance for use in connection with the deep well of an electrical range including a plurality of superposed removable and interchangeable skeleton suspensions and a lower fixed suspension for suspending articles of food within the deep well for baking.

The invention further aims to provide, in a manner as hereinafter set forth, a baking appliance for the purpose referred to which is simple in its construction, strong, durable, compact, readily assembled, conveniently handled and installed relative to the deep well of an electrical range, thoroughly efficient in its use, and comparatively inexpensive to manufacture.

Embodying the aims aforesaid and others which may hereinafter appear, the invention consists of the novel construction, combination and arrangement of parts as will be more specifically referred to and illustrated in the accompanying drawing, wherein is shown an embodiment of the invention, but it is to be understood that changes, variations and modifications may be resorted to which fall within the scope of the invention as claimed.

In the drawing:

Figure 1 is a fragmentary view in vertical section of an electrical range illustrating the deep well thereof, and showing the adaptation with the well of the baking appliance, in accordance with this invention, the appliance being in vertical section, Figure 2 is a side elevation of the appliance, and Figure 3 is a section broken away on line 3—3 Figure 2.

With reference to the drawing, the baking appliance which is in the form of a skeleton suspension structure of rack-like body is generally designated as 5.

An electrical range is indicated at 7 and its deep well at 8. As is well known an electric heating element, not shown, is correlated with the well 8 for heating it. The top of range 7 is designated 9 and it is formed with an opening 10. Integral with the inner face of the top 9 is a depending narrow collar 11 having its inner face forming a downward continuation of the edge or wall of opening 10. That portion of the range 7 which provides the wall of the deep well 8 is in the form of an annular shell 12, which extends upwardly through the collar 11 and opening 10 to slightly above the range top 9. The outer face of the shell 12 in proximity to its upper end bears against the wall of opening 10 and inner face of collar 11. The aforesaid parts of the range 7 are of known form.

The skeleton suspension structure 5 is to be removably mounted in the well 8. The structure 5 is substantially of circular form in plan and of a diameter less than the diameter of the well 8. The structure 5 includes a pair of diametrically opposed vertical supporting members 13 of like form each consisting of a pair of spaced parallel uprights 14 connected together at their upper ends by a cross head 15 of semi-ovoidal contour. The ends of the cross head 15 merge into the upper ends of the uprights 14. The cross heads 15 extend above the pairs of uprights 14 and are connected together by an inverted yoke-shaped vertically disposed handle 16. The sides 17 of handle 16 are secured at their lower ends to and centrally of the top of the cross heads 15, as at 18. The bight 19 of the handle 16 is of angle-form.

The structure 5 includes a set of skeleton suspension members indicated at 20, 21 and 22. The member 20 is of a slightly different construction than the members 21, 22. The member 20 is stationary and it is arranged between and fixedly secured to the members 13, as at 23. The members 21, 22 are arranged between and removably connected to the members 13 and disposed above the member 20. The latter consists of a ring 24 and a set of spaced parallel bars 25 each having its ends secured to opposite points of the ring 24. The bars 25, from the two central bars of the set, gradually decrease in length to the end bars of the set. The ring 24 is termed a carrier for the bars.

The members 21, 22 are of like construction, each consisting of a ring 26 formed of a pair of oppositely disposed arcuate portions 27 slightly less than a half circle, a pair of diametrically opposed horizontally arranged straight portions 28 merging at their ends into the ends of the portions 27, and a set of spaced parallel bars 29 each having its ends secured to aligned points of the portions 27. The bars 29, from the two central bars of the set, gradually decrease in length to the end bars of such set. The portions 28 of the ring constitute supports therefor.

Secured against the inner face of each supporting member 13 is a pair of superposed aligned horizontally disposed resilient channel-shaped suspension elements 30, 31. The elements 30, 31 on the inner face of one supporting member align respectively with the elements 30, 31 on the inner face of the other supporting member. The elements 30, 31 are formed with inwardly opening channels 32, which are also open at their ends. The said elements also constitute guiding, retaining and bridging means for purposes to be referred to.

The elements 30 are secured to the inner faces of the supporting members 13 below and in proximity to the cross heads 15, as at 32. The elements 31 are secured to the inner faces of the supporting members 13, as at 33, at a point disposed centrally between the elements 30 and the securing means 23 for the member 20. The elements 30, 31 bridge the space between and prevent the spreading of the uprights of the members 13. The aligned elements 30 removably support the skeleton suspension member 22. The aligned elements 31 removably support the skeleton suspension member 21. The parts 28 of the member 22 are slid simultaneously into the channels 32 of the aligned elements 30 to arrange said member in position to suspend articles of food. The parts 28 of the member 21 are slid simultaneously into the channels 32 of the aligned elements 30 to arrange said member 21 in position to suspend articles of food. As the elements 30, 31 are resilient they provide a frictional latch for the parts 28, whereby the members 21, 22 when supported from said element are releasably secured in the position aforesaid. The parts 28 of the members 21, 22 are of greater length than the elements 30, 31. The dimension of such parts in cross section with respect to the elements 30, 31 is such whereby the latter will frictionally grip such parts.

The member 20 is formed at diametrically opposed points with depending legs 34 having their lower ends align with the lower ends of the uprights 14. The legs 34 and uprights 14 coact to support the structure 5 stationary within and with the member 20 spaced above the bottom of the well.

There is shown, by way of example, a cover element 6 for closing the deep well 8, which when in closing position is removably mounted on the range and it includes a circular body part 35 of arcuate contour in diametric section and a rim 36 integral with and depending from body part 35. The rim 36 is of greater diameter than the shell 12 and is formed at its lower end with an outwardly directed annular flange 37 for seating on the top 9 of the range 7 when the element 5 is in position for closing well 8. The body part 35 is formed with a vent opening 38 controlled by a pivoted shutter 39 attached to said body part. The shutter 39 has a finger piece or lug 40 to facilitate the shifting thereof. The element 5 has attached to the body part 35 thereof a handle 41. The rim 36 is of a height to position the body part 35 in spaced relation to the top of the shell 12 when element 5 is disposed in closing relation with respect to the well.

The structure 5 is termed a food suspension means for removably mounting in the deep well of the range and it is so constructed for supporting edibles to be baked at different levels. The members 21, 22 are interchangeable. The members 20, 21, 22 may be employed simultaneously for suspending the edibles to be baked; or the member 20 may be employed alone; or the members 20, 21 together; or the members 20, 22 together. It is to be understood that when the members 20, 21, 22 are arranged in superposed relation only one of said members may be employed for suspending an edible to be baked. It is also to be understood that each of said members may suspend one or more edibles to be baked.

What I claim is:

1. In a baking appliance a pair of spaced aligned upstanding supports, a lower skeleton suspension member for an article of food to be baked arranged between and having spaced aligned parts fixedly secured to the inner faces of said supports above the lower ends of the latter, an intermediate skeleton suspension member for an article of food to be baked arranged between said supports, spaced aligned horizontally disposed channeled resilient elements fixed to the inner faces of said supports above said lower member overlapping and engaging spaced aligned parts of said intermediate member for supporting and releasably securing it to said supports, an upper skeleton suspension member for an article of food to be baked arranged between said supports, spaced aligned horizontally disposed channeled resilient elements fixed to the inner faces of said supports above said other elements overlapping and engaging spaced aligned parts of said upper member for supporting and releasably securing it to said supports, and a handle secured to the upper ends of the said supports.

2. In a baking appliance a pair of spaced aligned upstanding supports, a lower skeleton suspension member for an article of food to be baked arranged between and having spaced aligned parts fixedly secured to the inner faces of said supports above the lower ends of the latter, an intermediate skeleton suspension member for an article of food to be baked arranged between said supports, spaced aligned horizontally disposed channeled resilient elements fixed to the inner faces of said supports above said lower member overlapping and engaging spaced aligned parts of said intermediate member for supporting and releasably securing it to said supports, an upper skeleton suspension member for an article of food to be baked arranged between said supports, spaced aligned horizontally disposed channeled resilient elements fixed to the inner faces of said supports above said other elements overlapping and engaging spaced aligned parts of said upper member for supporting and releasably securing it to said supports, a handle secured to the upper ends of the said supports, said intermediate and upper members being interchangeable, said supports being of skeleton form and each having an upstanding cross head at its upper end, said handle having ends secured to said cross heads centrally of the latter, and spaced aligned legs depending from said lower member and having their lower ends aligned with the lower ends of said supports.

3. The invention as set forth by claim 1 having said skeleton suspension members of disc-like form, the said parts of the said intermediate and the said upper member being diametrically opposed and in parallel relation.

SUSAN POLLOCK.